United States Patent [19]
Ouchi et al.

[11] Patent Number: 5,737,133
[45] Date of Patent: Apr. 7, 1998

[54] MODULE FOR OPTICAL FIBER RECEPTACLE USED IN A SCANNING DEVICE

[75] Inventors: Masazumi Ouchi; Yasuyuki Shibayama; Keiji Kataoka, all of Hitachinaka, Japan

[73] Assignee: Hitachi Koki Co., Ltd., Tokyo, Japan

[21] Appl. No.: 691,141

[22] Filed: Aug. 1, 1996

[30] Foreign Application Priority Data

Aug. 11, 1995 [JP] Japan .................................. 7-205844
Apr. 17, 1996 [JP] Japan .................................. 8-095306

[51] Int. Cl.⁶ .......................... G02B 7/02; G02B 6/36
[52] U.S. Cl. ........................ 359/819; 385/36; 385/92; 385/93
[58] Field of Search ........................ 359/819, 281, 359/282; 385/14, 36, 93, 94, 33, 88, 92; 356/345, 350

[56] References Cited

U.S. PATENT DOCUMENTS

| | | | |
|---|---|---|---|
| 5,274,723 | 12/1993 | Komatsu | 385/92 |
| 5,333,224 | 7/1994 | Kikuchi | 385/93 |
| 5,388,171 | 2/1995 | Michikoshi et al. | 385/36 |
| 5,533,159 | 7/1996 | Okochi et al. | 385/93 |
| 5,537,503 | 7/1996 | Tojo et al. | 385/93 |
| 5,537,504 | 7/1996 | Cina et al. | 385/93 |
| 5,542,018 | 7/1996 | Kuhara et al. | 385/92 |

*Primary Examiner*—Loha Ben
*Attorney, Agent, or Firm*—Antonelli, Terry, Stout, & Kraus, LLP

[57] ABSTRACT

A module for an optical fiber receptacle used in an optical scanning device forming a latent image on a photosensitive body by scanning a laser beam emitted from the optical fiber, the efficiency of light use is improved. The module includes a module holder having a semiconductor laser for generating a laser beam, a lens for condensing the laser beam emitted from the semiconductor laser and a lens holder for holding the lens; a flat glass plate arranged on the optical path of the laser beam and fixed in the module holder; an optical fiber fixed onto a surface of the flat glass plate opposite to the surface facing the semiconductor laser through a photo-curing resin. The flat glass plate, the photo-curing resin and the optical fiber are made of materials having approximately equal refractive indexes.

6 Claims, 4 Drawing Sheets

1

MODULE FOR OPTICAL FIBER RECEPTACLE USED IN A SCANNING DEVICE

BACKGROUND OF THE INVENTION

The present invention relates to a module for an optical fiber receptacle used in an optical scanning device for forming a latent image on a photosensitive body by scanning a laser beam emitted from an optical fiber.

An electrophotographic apparatus for forming a latent image on a photosensitive body by scanning a laser beam using an optical fiber is disclosed, for example, in Japanese Patent Application Laid-Open No. 5-93878.

In an electrophotographic apparatus of this kind, it is required that the light beam emitted from a semiconductor laser be input into an optical fiber with a high efficiency of light use and in such a way that the efficiency of light use does not vary with a change in the environmental temperature.

In order to obtain a high efficiency of light use, it is important to align the focal point position of the laser beam with the light incident surface of the optical fiber. If the alignment is displaced out of an allowable positional range, the efficiency of coupling of the laser beam to the optical fiber decreases, and consequently a desired light intensity cannot be obtained. Therefore, there arises a problem in that a latent image having a necessary voltage level cannot be formed on the photosensitive body, and when the latent image is visualized using a developing agent, the image cannot be clearly formed.

Further, even if a high efficiency of light use is obtained, in a case where reflected light from the end surface of the optical fiber is returned to the semiconductor laser, the semiconductor laser becomes unstable and consequently there occurs a fluctuation of the light intensity. This phenomenon depends on the length of the light path from the emitting point of the laser beam to the reflecting point, which varies in response to a change in the environmental temperature.

SUMMARY OF THE INVENTION

An object of the present invention is to improve the efficiency of light use in an optical scanning device for forming a latent image on a photosensitive body by scanning a laser beam emitted from an optical fiber.

Another object of the present invention is to provide an optical scanning device which is capable of suppressing a fluctuation in light output due to the environmental temperature and which is capable of accurately forming a latent image.

A still further object of the present invention is to provide an optical fiber unit which is capable of efficiently accommodating the bonding of an optical fiber to a flat glass plate.

The objects of the present invention can be attained by providing an optical scanning device for forming a latent image on a photosensitive body by scanning a laser beam emitted from an optical fiber, which comprises a module holder having a semiconductor laser for generating a laser beam, a lens for condensing the laser beam emitted from the semiconductor laser and a lens holder for holding the lens; a flat glass plate arranged on the optical path of the laser beam and fixed in the module holder; and an optical fiber fixed onto a surface of said flat glass plate opposite to the surface facing the semiconductor laser using a photo-curing resin; the flat glass plate, the photo-curing resin and the optical fiber being made of materials having approximately equal refractive indexes.

It is preferable for the flat glass plate to have a non-reflection coating at least on the surface facing the semiconductor laser.

DETAILED DESCRIPTION OF THE PREFERRED EMBODIMENTS

An embodiment of the present invention will be described below, reference to the accompanying drawings.

Figure 1:
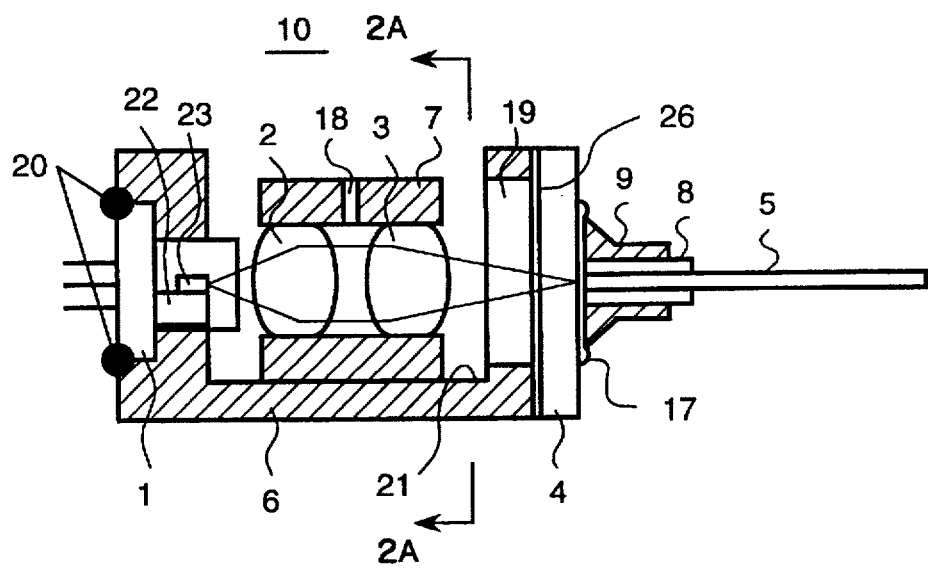
FIG. 1 is a cross-sectional side view showing an embodiment of an optical fiber unit in accordance with the present invention.
Figure 2:
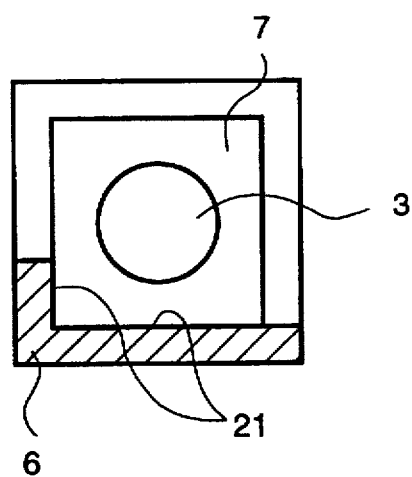
FIG. 2 is a cross-sectional view taken on the plane of the line 2A—2A in FIG. 1, showing an optical fiber unit in accordance with the present invention.

FIG. 1 is a cross-sectional side view showing an embodiment of an optical fiber unit applied to an optical scanning device in accordance with the present invention. FIG. 2 is a cross-sectional view taken on the plane of the line 2A—2A of FIG. 1.

The optical fiber unit is composed of a semiconductor laser 1, a lens 2, a lens 3, a flat glass plate 4, an optical fiber 5, a module holder 6, a lens holder 7, a ferrule 8 and a ferrule holder 9. The module holder 6, the lens holder 7 and the ferrule holder 9 are made of a stainless steel or a material having a low thermal expansion coefficient, such as Invar or Covar. The semiconductor laser 1 is fixed to the module holder 6 through laser welding 20 using a pulse oscillation YAG laser having a laser oscillator 23 and a heat sink 22. The flat glass plate 4 is bonded to the module holder 6 using an epoxy resin. On the surface of the flat glass plate 4 facing the semiconductor laser 1, a non-reflection coating is applied, such as by vapor deposition of magnesium fluoride ($MgF_2$) to form a non-reflection layer 26. The purpose of the non-reflection layer 26 will be described later.

The lens which focuses the laser beam onto the optical fiber is fixed to the lens holder 7. In a case where two lenses are used, as shown in FIG. 1, in the side surface of the lens holder 7 there is provided an air hole 18 through which air can enter in and flow out in order to prevent the lens 2 and the lens 3 from springing out due to thermal expansion of the air inside the lens holder 7, or, to prevent a lens from cracking due to air pressure. Although the description in this embodiment is directed to use of two lenses, the present invention is not limited by the number of lenses, and so one lens or more than three lenses may be employed.

As shown in FIG. 1 and FIG. 2, the module holder 6 and the lens holder 7 are positioned so as to be parallel to the optical axis of the laser beam, and the lens holder 7 contacts the supporting planes 21 crossing at a right angle to each other so that it can slide in the direction of the optical axis of the laser beam in such a way that the optical axis of the laser beam and the central axis of the lenses cannot be relatively displaced when the lens holder is slid. When the lens holder 7 is assembled onto the module holder 6, the position of the lens holder is adjusted by moving the lens holder along the supporting surfaces 21 so that the focal point of the laser beam emitted from the semiconductor laser 1 agrees with the outer surface of the flat glass plate 4. After this adjustment, the lens holder 7 is fixed to the module holder 6 by laser welding, or epoxy resin is filled between the lens holder 7 and the module holder 6 and the epoxy resin is set so as to fix the lens holder in position 7.

In order to easily handle the optical fiber 5, the top end portion of the optical fiber 5 is inserted into the ferrule 8 and the ferrule 8 is inserted into the ferrule holder 9, and then they are bonded together with epoxy resin. The ferrule holder 9 serves to increase the bonding area so as to maintain a firm mechanical strength when the optical fiber is bonded to the flat glass plate 4. Then, the end surfaces of the optical fiber 5, the ferrule 8 and the ferrule holder 9 are polished so that the end surfaces extend precisely in one plane. This is convenient because positional adjustment of the optical fiber can be performed by adjusting the position of the ferrule holder 9.

Photo-curing resin 17 is filled between the end surface of the optical fiber 5 and the flat glass plate 4 to adjust the position of the optical fiber 5. The positional adjustment in the direction of the optical axis of the laser beam can be performed by moving the optical fiber 5 toward the flat glass plate 4, since the position of the focal point of the laser beam is in a plane outside the flat glass plate 4 and the tolerance (allowable range of positional displacement) is large. The positional adjustment in the vertical direction with respect to the optical axis of the laser beam is performed by a fine adjusting stage, fixing the ferrule holder 9 so that the position of the focal point of the laser beam agrees with the light transmitting portion of the optical fiber.

On the surface on which the flat glass plate 4 of the module holder 6 is fixed, there is provided an opening 19 having an area larger than the area where the ferrule holder 9 is bonded and fixed to the flat glass plate 4, and light (ultraviolet lay) necessary for setting the photo-curing resin 17 is irradiated through the opening 19 to set the photo-curing resin. Since the photo-curing resin is set without heating and can be set by light irradiation in as short a time as several seconds, the effects of thermal expansion on the jig and the holders due to a temperature change during setting are small. Further, since bonding in accordance with the present invention is performed between surfaces, the volume of the photo-curing resin is small and accordingly the contraction of the resin during setting is also small. Therefore, in fixing the optical fiber 5 in accordance with the present invention, positional displacement of the optical fiber 5 during setting hardly occurs.

Further, by selecting materials having nearly equal refractive indexes for the flat glass plate 4, the photo-curing resin 17 and the optical fiber 5, and by performing a non-reflection coat treatment on the flat glass plate 4, as described above, the efficiency of light use can be increased, since reflection of light at the light incident portion of the optical fiber 5 can be prevented, and a phenomenon, such as instability of the laser oscillating intensity, can be prevented, since reflected light does not return to the semiconductor laser.

In this embodiment, quartz glass (refractive index $n_q$=1.46) is used for the flat glass plate 4 and the optical fiber 5, and the photo-curing resin 17 used is an acrylic resin or an epoxy resin having a refractive index $n_r$=1.45 to 1.57, for example, a photo-curing resin, Optodyne UV-2000 (trade name), a product of Daikin Industry Co. (refractive index $n_r$=1.48).

The transmission ratio T of light from the quartz glass plate to the optical fiber through the photo-curing resin can be expressed by the following equation:

$$T = \left[ 1 - \left( \frac{n_1 - n_2}{n_1 + n_2} \right)^2 \right]^2 \quad (1)$$

where $n_1$ is refractive index of the quartz glass (=1.46), $n_2$ is the refractive index of the photo-curing resin and $n_3$ is the refractive index of the optical fiber (=1.46), and $n_1 = n_3$.

Figure 7:
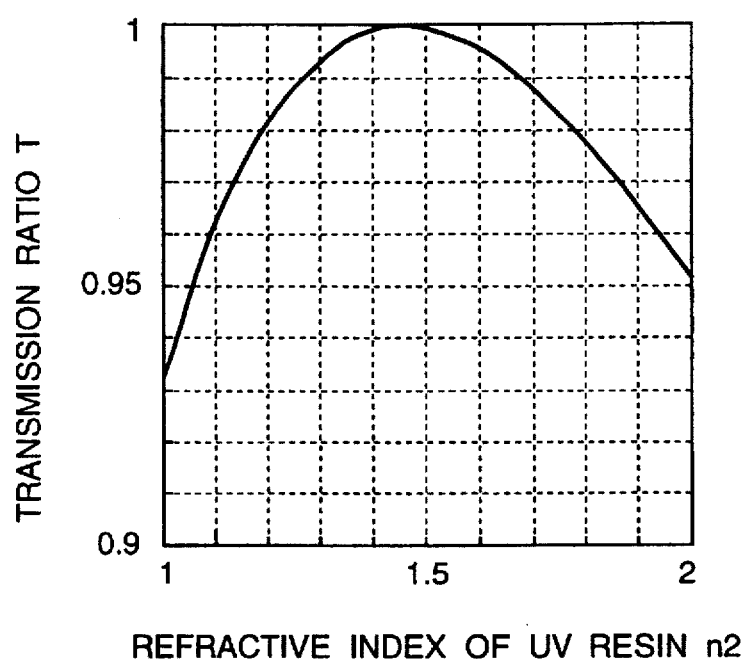
FIG. 7 is a graph showing the relationship between the transmission ratio of light from a quartz glass plate to an optical fiber T and the refractive index of a photo-curing epoxy resin $n_2$.

FIG. 7 is a graph showing the relationship between the transmission ratio of light from the quartz glass plate to the optical fiber T and the refractive index of a photo-curing epoxy resin $n_2$. It is clear from the figure that when the refractive index of the photo-curing epoxy resin is nearly equal to the refractive index of the quartz glass (=1.46), that is, within ±10% of the refractive index of the quartz glass, the decrease in the transmission ratio T can be below 0.5%.

Since the efficiency of light use is proportional to transmission ratio, it is possible to suppress the decrease in the efficiency of light use below 0.5% by suppressing the decrease in the transmission ratio T.

Figure 6:
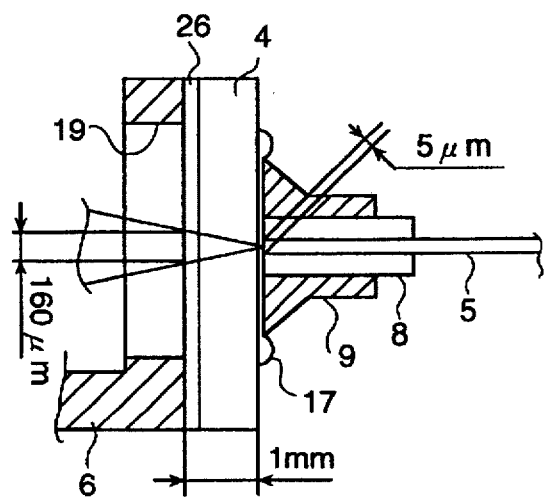
FIG. 6 is a sectional view for explaining the operation of a flat glass plate included in the optical fiber unit of the present invention.

Since the diameter of the core of the optical fiber 5 is approximately 5 µm, most of the light will be interrupted by even a little toner or dust attaching itself to the core and, and in such case the light cannot be accurately transmitted. As for this point, according to the present invention, since the flat glass plate 4 having a thickness of approximately 1 mm is set in the light incident surface of the optical fiber 5, as shown in FIG. 6, the diameter of the laser beam at the surface 26 of the flat glass plate 4 on the side facing the semiconductor laser is approximately 160 µm, whereas the spot diameter at the surface of the optical fiber (beam diameter at the core portion of the optical fiber) is approximately 5 µm. Therefore, even if an adherent having a size of several µm attaches itself on the flat glass plate 4, the effect produced by the adherent will be small.

The thickness $T_G$ of the flat glass plate may be set so as to satisfy Equation (2):

$$T_G > \pi \cdot d^2 \cdot n/4\lambda, \quad (2)$$

where d is a beam diameter in the core of the optical fiber, n is the refractive index of a region transmitting the light transmitted into the optical fiber, and $\lambda$ is the wavelength of the light.

Figure 3:
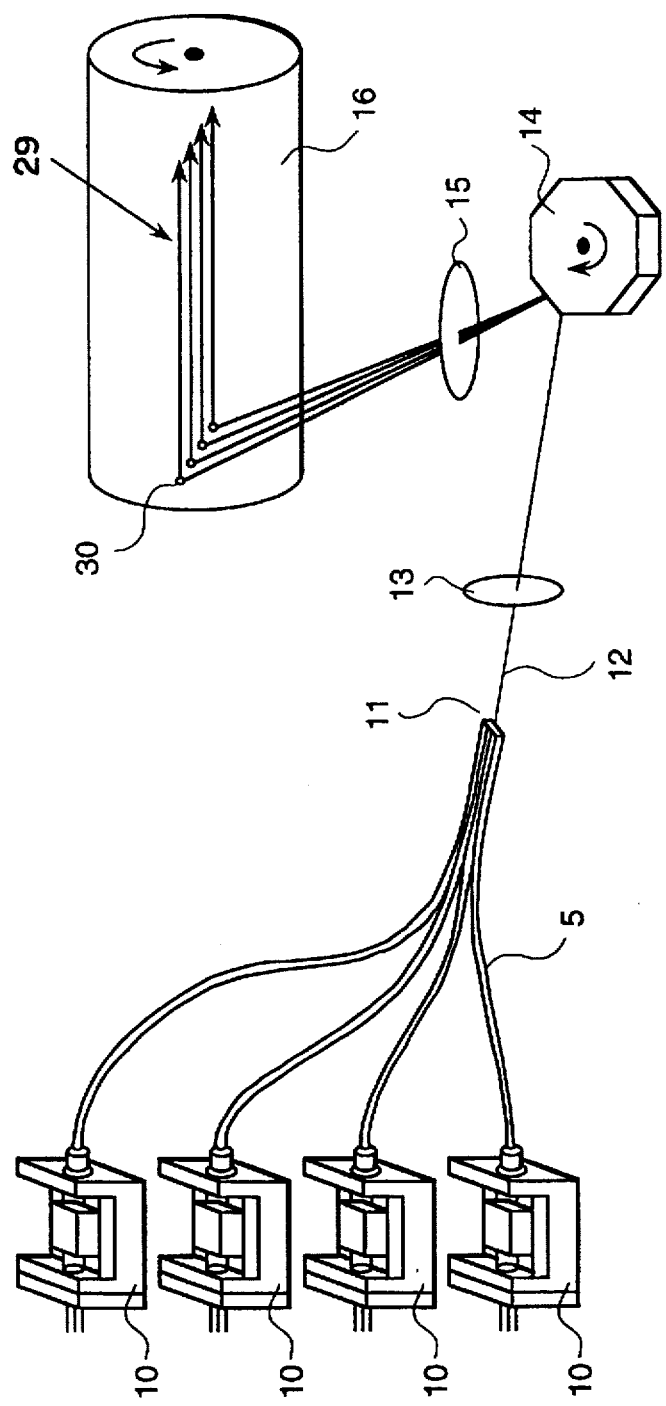
FIG. 3 is a schematic view showing the construction of an electrophotographic apparatus having a plurality of optical fiber units.

FIG. 3 is a schematic view showing the construction of an electrophotographic apparatus having four optical fiber units 10. An optical fiber array unit 11 is constructed by arranging the emitting terminals of the optical fibers 5 in an array-shape to construct a multi-beam generating device which is capable of emitting four laser beams 12 from the optical fiber array unit 11. Each of the four laser beams 12 is converted into a parallel light beam by a collimator lens 13 and is deflected by a rotating polygon mirror 14, and then the beams are scanned in parallel on a photosensitive drum 16 after passing through an fθ lens 15.

Figure 4:
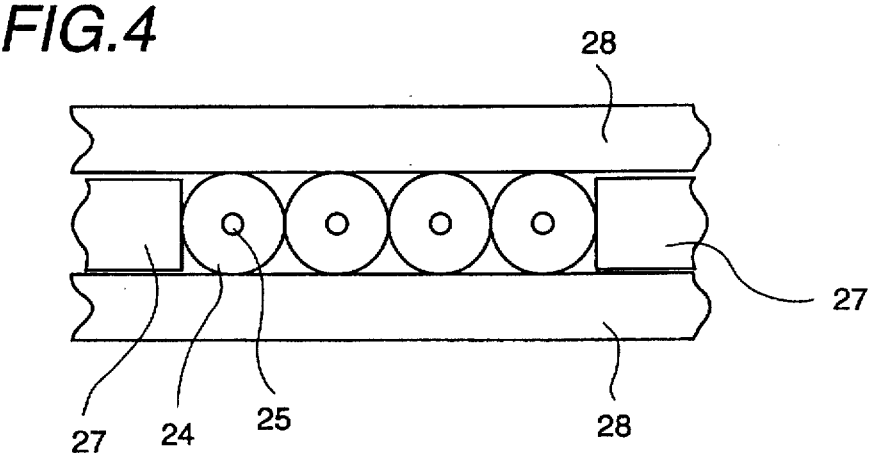
FIG. 4 is an end view showing the construction of an optical fiber array unit.

FIG. 4 is a view showing the detailed construction of the optical fiber array unit 11. An optical fiber is composed of a clad portion 24 and a core portion 25 made of a material containing $SiO_2$ as the main composition, an outer jacket made of nylon resin and so on for protecting the clad portion and the core. The top end portion of the clad portion 24, excluding the outer jacket, has an a accurate circular shape having a diameter of approximately 125 μm. On the other hand, in a case of a single mode fiber, the diameter of the core portion for guiding light is approximately 5 μm and is accurately arranged in the center of the clad portion 24.

Therefore, a plurality of optical fibers with their outer jacket removed are placed between horizontal flat plates 28 and pushed from both sides with pushing plates 27 so that the clad portions 24 are in contact with each other, as shown in FIG. 4. After that, the optical fiber array unit 11 is fixed with an adhesive and the end surface is polished. Thus, there is obtained a core row, that is, a multi-beam array, in which the optical fibers are aligned in a given space.

Figure 5:
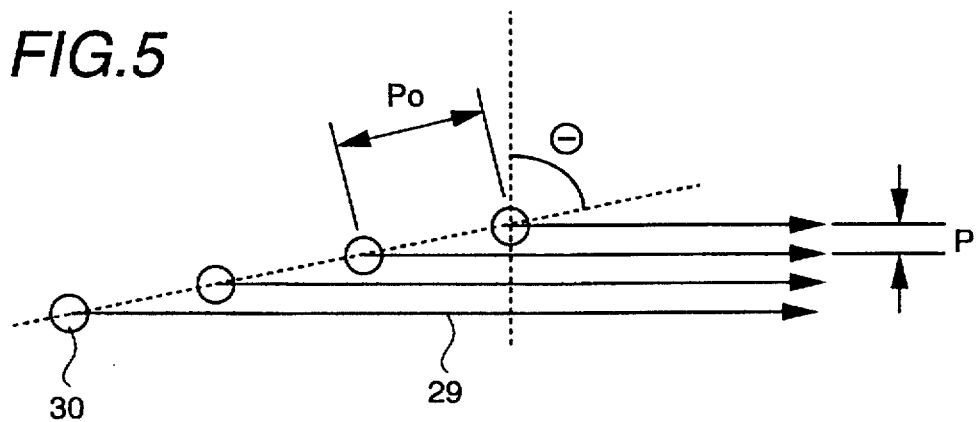
FIG. 5 is a diagrammatic view showing a scanning method using a plurality of beams.

Since the spacing between the cores is 125 μm whereas the diameter of the core is 5 μm, the spacing P0 between spots on the photo-recording material becomes 125 times as large as the spot diameter P. In order to solve this problem, the direction of the multi-beam array is inclined by θ degrees, as shown in FIG. 5, so that the pitch of the scanning lines becomes nearly equal to the spot diameter of the light beam. Therefore, the optical fiber array unit is inclined.

As described above, according to the present invention, it is possible to substantially improve the efficiency of light use in an optical scanning device forming a latent image on a photosensitive body by scanning a laser beam emitted from an optical fiber.

What is claimed is:

1. A module for an optical fiber receptacle used in a scanning device, which comprises:
    a module holder having a semiconductor laser for generating a laser beam, a lens for condensing the laser beam emitted from the semiconductor laser and a lens holder for holding the lens;
    a flat glass plate arranged on the optical path of said laser beam and fixed in said module holder; and
    an optical fiber fixed onto a surface of said flat glass plate opposite to the surface facing the semiconductor laser using a photo-curing resin;
    said flat glass plate, said photo-curing resin and said optical fiber being made of materials having approximately equal refractive indexes.

2. A module according to claim 1, wherein said flat glass plate has a non-reflection coating at least on the surface facing said semiconductor laser.

3. A module according to claim 1, wherein a light irradiation opening for setting said photo-curing resin is provided between said lens holder and said flat glass plate.

4. A module according to claim 1, wherein the thickness ($T_G$) of said flat glass plate satisfies the relationship $$T_G > \pi \cdot d^2 \cdot n / 4\lambda,$$

wherein d is a beam diameter in the core of the optical fiber, n is the refractive index of a region transmitting the light entering into the optical fiber, and λ the wavelength of the light.

5. A module according to claim 1, wherein a ferrule and a ferrule holder for supporting the outer periphery of said ferrule are provided at an end of a fixed side of said optical fiber, said end of said optical fiber being fixed to said flat glass plate.

6. A module according to any one of claim 1 to claim 4, wherein said flat glass plate and said optical fiber are made of quartz glass, said photo-curing resin being any one of acrylic resin and epoxy resin having a refractive index of 1.45 to 1.57.

* * * * *